May 13, 1930.    P. SEEHAUS    1,758,474
STORAGE AND UTILIZATION OF ELECTRICALLY GENERATED HEAT
Filed Dec. 20, 1926    2 Sheets-Sheet 1
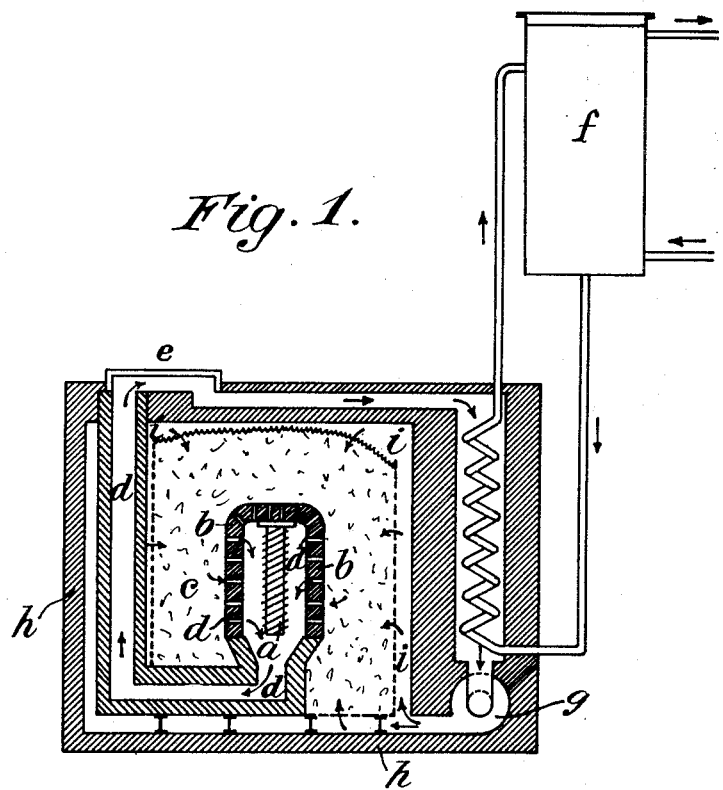
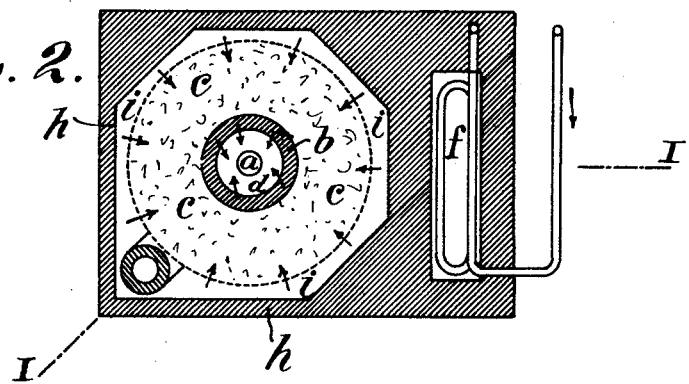
P. Seehaus
INVENTOR
By: Marks & Clark
ATTYS.

May 13, 1930. P. SEEHAUS 1,758,474
STORAGE AND UTILIZATION OF ELECTRICALLY GENERATED HEAT
Filed Dec. 20, 1926 2 Sheets-Sheet 2
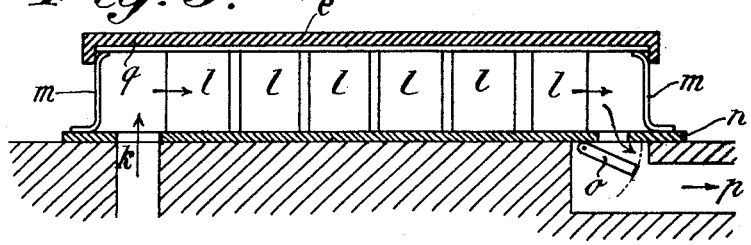
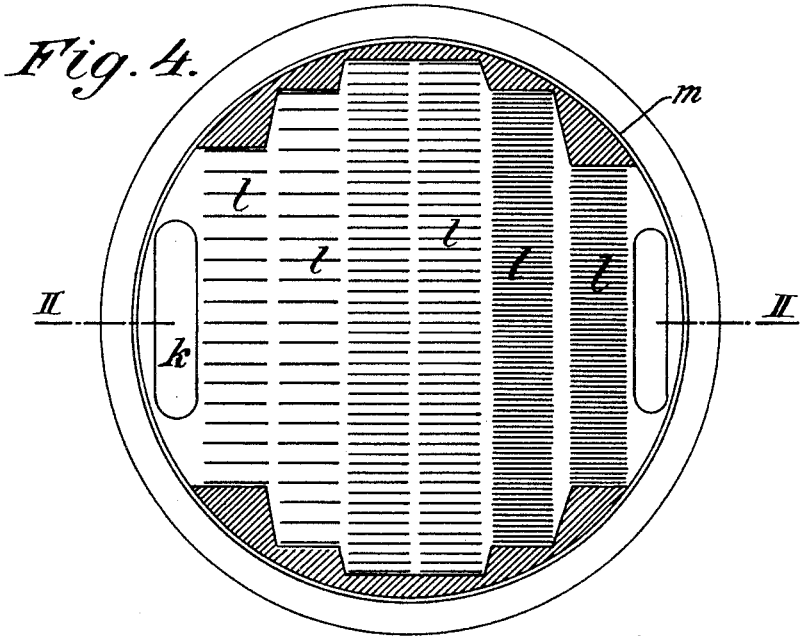
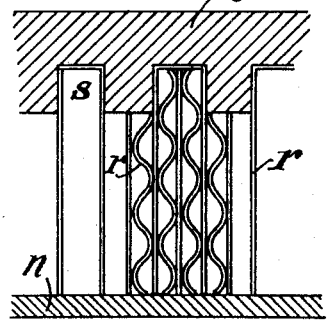
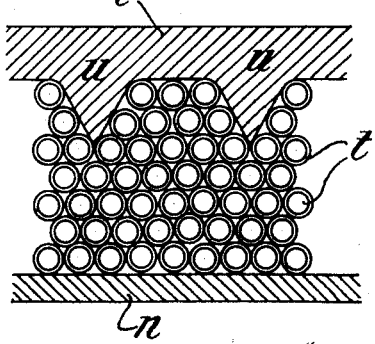
P. Seehaus
INVENTOR Patented May 13, 1930

1,758,474

UNITED STATES PATENT OFFICE

PAUL SEEHAUS, OF ZURICH, SWITZERLAND

STORAGE AND UTILIZATION OF ELECTRICALLY-GENERATED HEAT

Application filed December 20, 1926, Serial No. 156,028, and in Switzerland December 24, 1925.

In that group of methods of and apparatus for the storage and utilization of electrically generated heat, in which the stored heat is utilized in separate heat consuming apparatus, the steam boilers, hot water containers or the bodies of material having a great heat absorbing capacity, such as iron, steatite or the like, which form the core of the storage apparatus, have hitherto been enclosed in thick heat insulating layers, in order that they shall dissipate to the surroundings as little as possible of the heat generated by means of electric heating devices in the said storage bodies. In such arrangements the heat is withdrawn from the core, all parts of which are usually of approximately the same temperature and conveyed to the heat consuming apparatus by means of pipe lines or passages and gases or liquids put in motion therein. Through the insulating covering heat is continuously dissipated to the surroundings both during the heating operation and during the withdrawal of heat, which is lost as far as its utilization is concerned and the amount of which fluctuates with the difference in temperature between the heart of the storage apparatus and the surroundings according to the insulating effect of the covering and the heat saturation of the latter.

In order to at least partially prevent this loss of heat, according to the present invention the heat transmitting medium is passed from all sides through an insulating covering which is pervious to the said medium and serves for the storage of a part of the heat and afterwards through heat consuming devices this passing of the heat transmitting medium through said covering occurs at the same time, but in opposite direction to the heat loss streams. To ensure that the circulating medium may return to the insulating covering at a low temperature, heat consuming devices are preferably inserted in which a medium to be heated is arranged in a counterflow to the heat transmitting medium. The insulating covering has external admissions for the heat transmitting medium from all sides and an internal outlet and encloses at least one relatively small core of fairly good heat storing material which may absorb some of the heat to be stored and contains the electric heating device.

The accompanying drawings show a constructional example of an apparatus for carrying out the method forming the subject of the present invention.

Fig. 1 being a vertical section on line I—I of Fig. 2 and

Fig. 2 a horizontal section through Fig. 1,

Fig. 3 the general arrangement of an improved cooking plate, through which the gas passes diagonally, in vertical diagonal section on line II—II of Fig. 4, Fig. 4 a horizontal section through Fig. 3, Figs. 5 and 6 two constructional forms of the segments, showing how the heat is conveyed from one to the other and to the cooking plate.

The heat generated by means of the electric heating device $a$ (Fig. 1) is stored partly in the storage core $b$ and partly in the insulating covering $c$ which is pervious to gas or liquid. The storage core $b$ is relatively small, so that it can only absorb at most a portion of the heat to be stored. It consists of heat storing material such as steatite, cast iron, water and so on and can be shaped to form a collecting space for the heating medium which flows from all sides through the insulating covering. The insulating covering $c$ may consist of a porous body, of superposed plates or of loose sand from tiles or the like, in the latter case the external shape being preserved by a surrounding perforated shell. $d$ $d$ are the collecting space and the passages for conveying away the gas or liquid, through which it passes after penetrating the insulating covering from the core to the heat consuming devices $e$ and $f$. $e$ represents for instance cooking or frying plate and $f$ an apparatus with water circulation for heating water, which requires a less high temperature. The latter arrangement is swept over by the heat transmitting medium according to the counterflow principle, so that the circulated medium is conveyed with a low temperature by means of the conveying device $g$ in closed circulation back to the closed space $i$ surrounding the insulating covering $c$ and formed by the outer shell $h$. From said closed space $i$ the circulated medium is conveyed on its circulation through practically the whole outer surface of the insulating covering $c$ back into this latter. The temperature of the medium at the outer surface of the insulating covering $c$ is low if for instance, fresh air or fresh water is pressed or sucked through the covering. The temperature is also low when the medium is circulated through heat consuming devices which are arranged to operate in counterflow with the medium. The lower the temperature of the medium reaching the insulating covering and entering thereinto, the smaller the heat loss, for at the end of a period of heat withdrawal the covering $c$ is discharged deeply toward the core so that the heat passing outwardly from the core must again saturate the covering on the outside thereof before there is any appreciable temperature causing losses. Therefore it is superfluous to provide the storing covering $c$ with a separate protecting covering acting only as insulation. The velocity at which the gas or liquid circulates is capable of being regulated by means of flaps or slides in the passages or by regulating the number of revolutions of the conveying device. The heat transmitting medium may also be conveyed away out of the core and to various heat consuming devices which are independent of one another in branch passages which are independent of one another and are capable of independent regulation. The conveyance may be mechanical or may be based on the variations in temperature of the medium.

It is also possible to subdivide the insulating covering into superposed independent insulating coverings and to provide each of these partial insulating coverings with an outer inlet and an inner outlet for a moving medium, the innermost insulating covering at least being provided with electric heating devices, and to operate each of the concentrically, heat storing and insulating layers independently of the others in combination with one or more heat consuming devices. Thus, for instance the inner device is used for the generation of steam and one of the outer devices, for instance one surrounding the inner one, for heating the feed water.

When air is used as the heat transmitting medium, it is obvious that the common air space can be included in the closed circulation, by withdrawing from it the quantity of air to be circulated and passing out through the insulating covering and the other devices in the direction described, if the return of the heat still contained in the air after it has left the last heat consuming device be waived or if this amount of heat be utilized by means of a chimney for imparting movement to the air.

In order to obtain practically admissible outer dimensions in applying the described storing method to cooking-ranges it must be operated with low core temperatures because a too high gradient of temperature would quickly saturate the heat storing and insulating covering which is limited in its dimensions. The losses, therefore, between the singular discharges would become too great. A low core-temperature has the advantage of increasing the life of the electric heating-device. In order to attain a sufficient heating of the cooking-plates also with such low temperatures of the medium conveyed to the cooking plates, according to the constructional examples shown in Figs. 3 to 6 metal elements having a very large superficial area are distributed over the entire cross-sectional area of the stream of gas under the cooking plate, which are all provided with metallic heat transmitting means to the underside of the cooking plate and the number, superficial area and thickness of material of which is distributed in the direction of the stream of gas and at right angles to the same below the cooking plate in such a manner that there will be approximately uniform or regulable transmission of heat from the upper side of the cooking plate to the pan placed thereon, although the entering heated gas has a higher temperature than the emerging gas after it has given off its heat. Through the very large superficial area of all the elements and the metallic conduction of the elements to the cooking plate, there will be a considerable transmission of heat, even at the relatively low gas temperatures, from the gas to the elements and from the latter to the cooking plate and the pan placed thereon. The metallic conduction of heat from the elements to the cooking plate may be so arranged that, in spite of the different coefficient of expansion due to heat of the materials of the elements and the cooking plate, there will be no strains detrimentally affecting the strength of the plate and causing it to warp. The elements may be so arranged that the gas will enter either below the centre of the cooking plate and flow off in radial direction on all sides or enter on one end of a diameter and escape on the opposite end of the same diameter but be distributed between inlet and outlet over the cooking plate. The uniformity of the heat transmission may be made by metallic deposits on the lower side of the cooking plate or by covering it with sheets of copper or the like.

The heated gas passes through the opening $k$ into the apparatus which is enclosed on all sides so as to be gas-tight and consists of a cooking plate $e$, on which the pan is placed, the elements $l$, the gas-tight outer shell $m$ and the bottom plate $n$, and, after giving off heat, leaves the apparatus through the regulating valve $o$ and the passage $p$. $q$ is a heat equalizing metal sheet fitted to the lower side of the plate or metallic deposit on the same. As indicated in Figure 4 the number of elements belonging to a definite length of chord increases from the side where the gas enters to the side where it leaves in accordance with the reduction in the temperature of the gas. By varying the number of elements of each group the transmission of heat to the various parts of the cooking plate e may be regulated.

As elements may be used, for instance thin, flat or corrugated strips of metal, thin, smooth or longitudinally or transversely corrugated metal casings, metal shavings or metal wool of copper or the like, which allow the stream of gas to pass through. They offer a total superficial area which is up to 50 times or more greater than the superficial area of the cooking plate. The contact surface between the cooking plate and the elements may be further increased by the provision of ribs or grooves on the underside of the cooking plate.

Figure 5 shows by way of example to an enlarged scale and in section at right angles to the stream of gas elements made of flat and corrugated strips of metal r, the corrugated strips providing a suitable passage for the gas. The metal strips are in part let into grooves s in the cooking plate, where they may be soldered. In this way such a good metallic connection is provided for the transmission of heat from the elements to the cooking plate that, in spite of the different coefficients of heat expansion of the materials, of which the elements and the cooking plate are made, there will be no strains detrimentally affecting the strength and the straightness of the plate. Instead of being vertical, as shown in the figure, the metal strips r may be arranged horizontally, i. e. parallel to e.

Figure 6 shows by way of example to an enlarged scale in section at right angles to the stream of gas, the use of thin metal tubes t for the elements, which are packed in between the cooking plate e and the bottom plate n in such a manner that their axes lie in the direction of the stream of gas. In this way of conducting the heat as well from the elements to the cooking plate there will be no detrimental strains in spite of the difference in the coefficient of heat expansion of the two materials. The parts u are projections on the lower side of the cooking plate for increasing the contact surfaces. The good contact between the elements themselves and between the elements and the cooking plate for establishing metallic heat conduction is ensured by the weight of the cooking plate and the pan placed thereon or by clamping means for forcing the bottom plate n and the cooking plate e towards one another. In place of the metal tubes metal shavings or metal wool may be used.

What I claim is:

1. An apparatus for storing and utilizing heat, comprising at least one core of heat storing material, a heating device located within said core, this core being adapted to absorb at most a portion of the heat to be stored, at least one heat-insulating and storing covering surrounding said core and consisting of material pervious for the medium to be heated, an admission passage for the medium surrounding said covering, and an outlet for the medium leading away from the inside of said core.

2. An apparatus for storing and utilizing electrically generated heat, comprising a hollow core of heat storing material, an electric heating device located in the hollow space of this core, passages in the wall of said core, connecting the inside with the outside thereof, a heat-storing and insulating covering surrounding said core and consisting of material pervious to the medium to be heated, an admission passage for this medium extending over the whole outer surface of the covering, an outlet passage for the medium leading from the inside of said core, a circulation passage connecting this outlet passage with said admission passage, means located in the circulation passage for regulating the velocity of the medium flowing through this passage and heat consuming devices also located in said circulation passage.

3. An apparatus as claimed in claim 2, comprising a cooking device and a conveying device both located in the circulation passage, said conveying device being arranged so as to permit the velocity of the circulating medium to be regulated, a heat consuming device requiring a less high temperature than the cooking device being inserted in the circulation passage behind said cooking device.

4. An apparatus for storing and utilizing electrically generated heat, comprising a core of heat storing material, a hollow space within this core, an electric heating device located in said hollow space, a heat storing and insulating covering made of porous material surrounding the core, passages in the core connecting the covering with the hollow space in the core, an admission passage surrounding substantially the whole surface of the heat-storing and heat insulating covering, an outlet passage connected with the hollow space in the core, a circulation passage connecting said outlet passage with the admission passage, a cooking plate device inserted in this circulation passage, heat transmitting metal elements on the cooking plate in the path of the heated medium, the total superficial area of which elements being a multiple of that of the under side of the cooking plate with which they are in metallic contact.

5. An apparatus for storing and utilizing heat comprising a source of heat, a heat storing device surrounding this source of heat and pervious for the medium to be heated, a collecting space within this storing device, an admission passage surrounding said storing device, a circulation passage connecting said collecting space with the admission passage, a cooking plate device located in said circulation passage, heat transmitting elements on the cooking plate located in the path of the heated medium, the total superficial area of these elements being a multiple of that of the surface of the under side of the cooking plate, said elements being in metallic contact with the cooking plate and distributed over the entire cross-sectional area of the stream of heating medium under the cooking-plate in such a manner that the delivering of heat from the cooking plate is effected according to a desired rule.

6. An apparatus for storing and utilizing heat, comprising a hollow core of heat storing material having perforations in its wall, an electrical heating device arranged within this core, a heat-storing and heat-insulating covering consisting of porous material enclosing said core, an admission space surrounding this covering, an outlet canal connected with the inside of said core, a circulation passage connecting this outlet canal with said admission space, a cooking-plate device arranged in said circulation passage, metal elements arranged on the under side of the cooking-plate in the path of the hot medium in such a manner that the contact between the cooking plate and the elements as well as between the elements themselves, required for the proper metallic conduction of heat from the elements, allows the separate parts to expand freely at any temperature, the total superficial area of said elements being a multiple of that of the surface of the under side of the cooking-plate.

7. An apparatus for storing and utilizing heat according to claim 6, in which the metal elements arranged on the under side of the cooking-plate form passages lying next to one another and over one another and having approximately the same direction.

8. An apparatus for storing and utilizing heat, comprising a body consisting of heat-storing and heat-insulating material pervious for the medium to be heated, an electric heating device arranged in the interior of this body, an admission room for said medium surrounding practically the entire outer surface of said body, a delivery passage leading from the interior of the body to the heat consuming places, means for causing the medium to be heated to flow from said admission room through the material of said body towards the heating device, and into said delivery-passage.

In testimony whereof I have affixed my signature.

PAUL SEEHAUS.